United States Patent [19]

Kashiwabara et al.

[11] Patent Number: 5,707,314
[45] Date of Patent: Jan. 13, 1998

[54] METHOD AND APPARATUS FOR CONTROLLING A CONTINUOUSLY VARIABLE TRANSMISSION

[75] Inventors: Masuo Kashiwabara; Hiroyuki Yuasa, both of Atsugi, Japan

[73] Assignee: Unisia Jecs Corporation, Kanagawa-ken, Japan

[21] Appl. No.: 630,799

[22] Filed: Apr. 10, 1996

[30] Foreign Application Priority Data

Apr. 10, 1995 [JP] Japan .................. 7-084078

[51] Int. Cl.$^6$ .................................. F16H 61/00
[52] U.S. Cl. .................. 477/45; 477/48; 474/17
[58] Field of Search .................. 477/44, 45, 46, 477/48; 474/18, 17, 28

[56] References Cited

U.S. PATENT DOCUMENTS

| | | | |
|---|---|---|---|
| 4,534,748 | 8/1985 | Stieg et al. | 474/17 |
| 4,663,990 | 5/1987 | Itoh et al. | 477/48 X |
| 4,674,363 | 6/1987 | Miyawaki | 477/49 |
| 4,682,519 | 7/1987 | Okada et al. | 477/48 |
| 4,827,804 | 5/1989 | Tezuka et al. | 477/45 |
| 4,858,497 | 8/1989 | Kouno | 477/48 |
| 5,062,050 | 10/1991 | Petzold et al. | 477/45 X |
| 5,114,383 | 5/1992 | Hirano et al. | 474/18 |
| 5,168,778 | 12/1992 | Todd et al. | 474/18 X |
| 5,334,102 | 8/1994 | Sato | 474/18 |
| 5,427,579 | 6/1995 | Kanehara et al. | 474/28 |

FOREIGN PATENT DOCUMENTS

| | | |
|---|---|---|
| 1-164632 | 6/1989 | Japan . |
| 5-48381 | 7/1993 | Japan . |

*Primary Examiner*—Charles A. Marmor
*Assistant Examiner*—Peter T. Kwon
*Attorney, Agent, or Firm*—Lowe, Price, LeBlanc & Becker

[57] ABSTRACT

In order to optimize the speed change control of a continuously variable transmission, a necessary minimum primary pressure (Ppmin) for achieving speed change ratio control, a necessary minimum line pressure (Plmin) for the non occurrence of slippage between a secondary pulley 3 and a belt 4, and a required speed change ratio line pressure (Plratio) which can realize a target speed change ratio without slippage on the primary pulley 2 side are computed. The highest of these is then selected, and a final output line pressure (Plprs) then obtained based on the selected line pressure. By using this line pressure (Plprs) to control a secondary pulley actuator 3a, slipping of the belt 4 can be prevented and a target speed change ratio achieved, with an extremely simple construction compared to that of conventional arrangements.

10 Claims, 10 Drawing Sheets

FIG.5
(1) PRIMARY MINIMUM PRESSURE (Ppmin) COMPUTATION
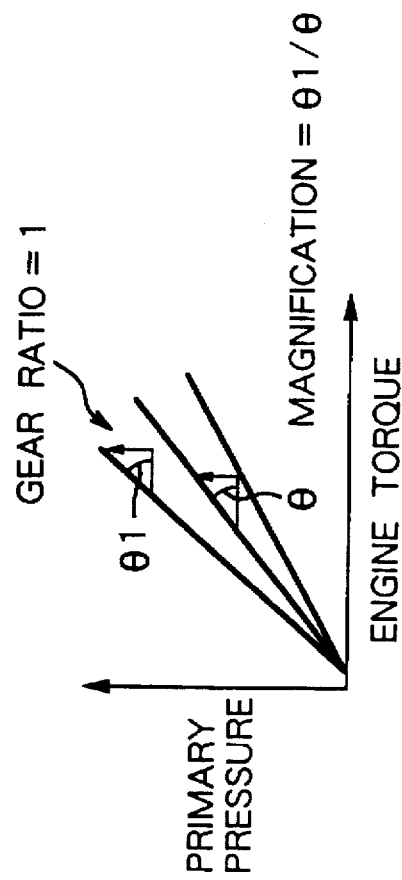
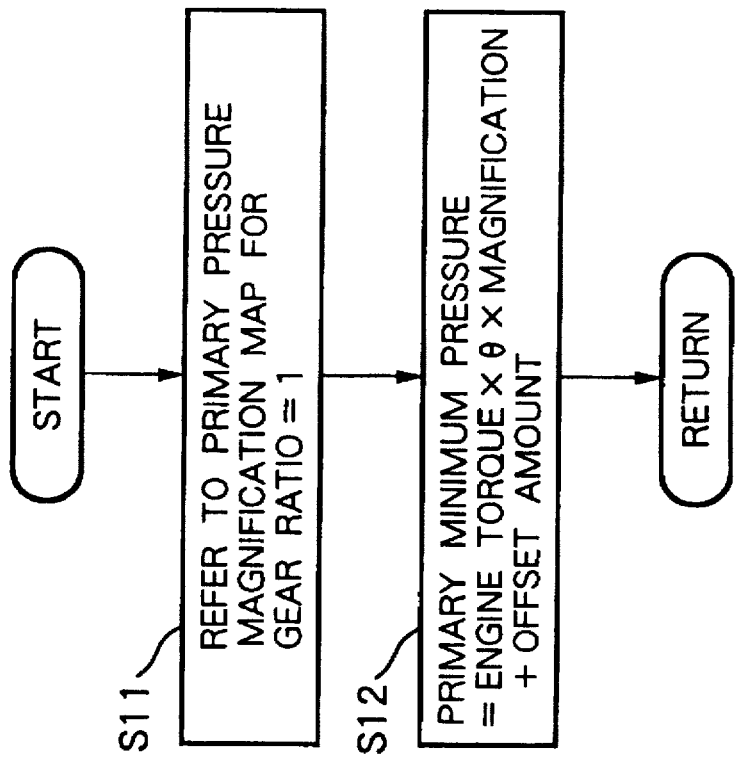

(2) MINIMUM LINE PRESSURE (Plmin) COMPUTATION (3) REQUIRED SECONDARY FORCE (FS) COMPUTATION (4) REQUIRED SPEED CHANGE RATIO LINE PRESSURE (Plratio) COMPUTATION (5) BASIC LINE PRESSURE (Pl base) COMPUTATION (6) SECONDARY CENTRIFUGAL OIL PRESSURE (Pscen) COMPUTATION (7) OUTPUT LINE PRESSURE (Plprs) COMPUTATION

METHOD AND APPARATUS FOR CONTROLLING A CONTINUOUSLY VARIABLE TRANSMISSION

BACKGROUND OF THE INVENTION (1) Field of the Invention

The present invention relates to technology for improving methods and apparatus for controlling a continuously variable transmission which is provided for example between a drive source (engine and the like) and a drive shaft.

(2) Description of the Related Art

Heretofore with control apparatus for a continuously variable transmission (CVT), as a method for controlling the line pressure supplied to the speed change ratio controller to an appropriate value there is the arrangement as disclosed for example in Japanese Examined Patent Publication No. 5-48381, and in Japanese Unexamined Patent Publication No. 1-164632.

With the arrangement disclosed in Japanese Examined Patent Publication No. 5-48381 (first prior art example), the necessary line pressure per unit torque for each speed change ratio is calculated and a pressure of this value multiplied by the engine torque, is controlled as the target line pressure.

With the arrangement disclosed in Japanese Unexamined Patent Publication No. 1-164632 (second prior art example), a speed change oil pressure determined from a difference of an actual speed change ratio (or an actual engine rotational speed) from a target speed change ratio (or a target engine rotational speed), and a minimum oil pressure to ensure that the belt does not slip, are computed and the actual oil pressure of the speed change control oil chamber (primary pulley side) is controlled to the higher of the two.

The line pressure for supplying the secondary pulley side actuator however it is fundamentally considered to be one decided by the following 2 requisites;

(1) So that a thrust force to ensure that the belt does not slip on the secondary pulley side can be produced.

(2) So that the belt does not slip on the primary pulley side and a target speed change ratio can be achieved.

With the first prior art example however, only the first requisite (1) is given consideration. That is to say only the prevention of slippage of the belt on the secondary pulley side is considered. Hence the second requisite (2) cannot be achieved. There is thus the problem that the supply pressure (speed change pressure) on the primary pulley side becomes too small so that the belt slips, and hence the target speed change ratio cannot be achieved.

Moreover, in general, the speed change control valve system provided in a hydraulic circuit for carrying out speed change control of a belt type CVT, comprises flow control valves as shown in FIG. 12. With a construction using such flow control valves, direct extremely fine control of the speed change pressure is not possible. Hence in the case of the second prior art example, where the speed change pressure of the speed change control oil chamber is extremely finely controlled, then since all of the control is born by the speed change control valve system, the construction becomes extremely complicated, the control difficult, with a special feedback control and the like becoming indispensable. It is therefore not possible to achieve any reasonable reduction in cost.

SUMMARY OF THE INVENTION

The present invention takes into consideration the above-mentioned situation with the conventional arrangement, with the object of providing a method and apparatus for controlling a continuously variable transmission which can reliably prevent slipping of the drive transmission member and achieve a target speed change ratio, with a simple and low cost construction. Moreover it is an object of the invention to facilitate for example an increase in accuracy and a simplification of construction of the abovementioned control method and apparatus, In order to achieve the above objects, the method and apparatus according to the present invention for controlling a continuously variable transmission comprising; a drive side rotating member which receives a rotation force from a drive source, a driven side rotating member, and a drive transmission member disposed therebetween for transmitting drive between both members, a speed change control oil chamber for carrying out speed change by changing one of; a drive side contact radius (a distance of a contact position of the drive side rotating member and the drive transmission member from the rotation axis), and a driven side contact radius (a distance of a contact position of the driven side rotating member and the drive transmission member from the rotation axis), by the supply or discharge of an operating oil based on a signal from a control apparatus, and a contact face pressure control oil chamber for controlling the contact radius on the side which is not speed change controlled by the speed change control oil chamber, to give a contact face pressure on the transmission member necessary for torque transmission, is constructed that a first oil pressure, being the minimum limit pressure for the contact face pressure control oil chamber necessary so that slipping does not occur on the drive transmission member, and a second oil pressure, being the minimum limit pressure for the contact face pressure control oil chamber necessary to maintain a target speed change ratio, are computed and the highest of the two computed pressures is selected and acts on the contact face pressure control oil chamber.

With such a construction, the slippage of the drive transmission member occurring in the case wherein as with the conventional arrangement only one of the drive side rotating member side and the driven side rotating member side is considered with no relation therebetween, is reliably prevented, and the problem wherein the target speed change ratio (torque ratio) cannot be achieved, can be reliably solved. Also, since the control is born by the pressure control for the contact face pressure control oil chamber, then a low cost apparatus of simple construction can be achieved.

The construction may be such that a third oil pressure, being the minimum pressure of the speed change control oil chamber necessary so that slippage does not occur on the drive transmission member, is computed and the second oil pressure is computed based on the computed third oil pressure and the input torque which is at least input to the drive side rotating member.

In this way, by having the construction wherein the second oil pressure for the contact face pressure control oil chamber is obtained based on the third oil pressure for the speed change control oil chamber, then the second oil pressure for the contact face pressure control oil chamber can be obtained by a comparatively simple method, the construction can be simplified, and the drive side rotating member can be made to relate to the driven side rotating member with high accuracy. Therefore, slippage of the drive transmission member can be positively prevented, and the target speed change ratio (torque ratio) thus achieved.

Moreover the construction may be such that the third oil pressure is computed based on the input torque and the target speed change ratio. Furthermore, the construction may be such that the third oil pressure is computed by computing an oil pressure in a predetermined speed change ratio based on the input torque and a necessary oil pressure per unit torque in a predetermined reference speed change ratio, and correcting the computed results based on the speed change ratio. With such a construction, the third oil pressure can be computed with a simple construction and to a high accuracy.

Moreover the construction may be such that the first oil pressure is computed by computing an oil pressure in a predetermined speed change ratio based on the input torque and a necessary oil pressure per unit torque in a predetermined reference speed change ratio, and correcting the computed result based on the speed change ratio. In this way, the first oil pressure can be computed to a high accuracy by a simple method similar to that mentioned before.

Now the construction may be such that the drive side rotating member comprises a pulley with a changeable effective wrapping diameter, the driven side rotating member comprises a pulley with a changeable effective wrapping diameter, and the drive transmission member comprises a wrapping type transmission medium for wrapping around these.

With such a construction the present invention becomes applicable to so called movable pulley type continuously variable transmissions adopted in practice in vehicles and the like, and can thus be advantageous from the point of view of cost reduction, commonality of parts, endurance, maintenance and so on.

Further objects and aspects of the present invention will become apparent from the following description of embodiments given in conjunction with the appended drawings.

BRIEF DESCRIPTION OF THE DRAWINGS

FIG. 5 is a flow chart for explaining a block (1) in FIG. 4;

DESCRIPTION OF THE PREFERRED EMBODIMENTS

As follows is a description of the embodiments of the present invention.

Figure 2:
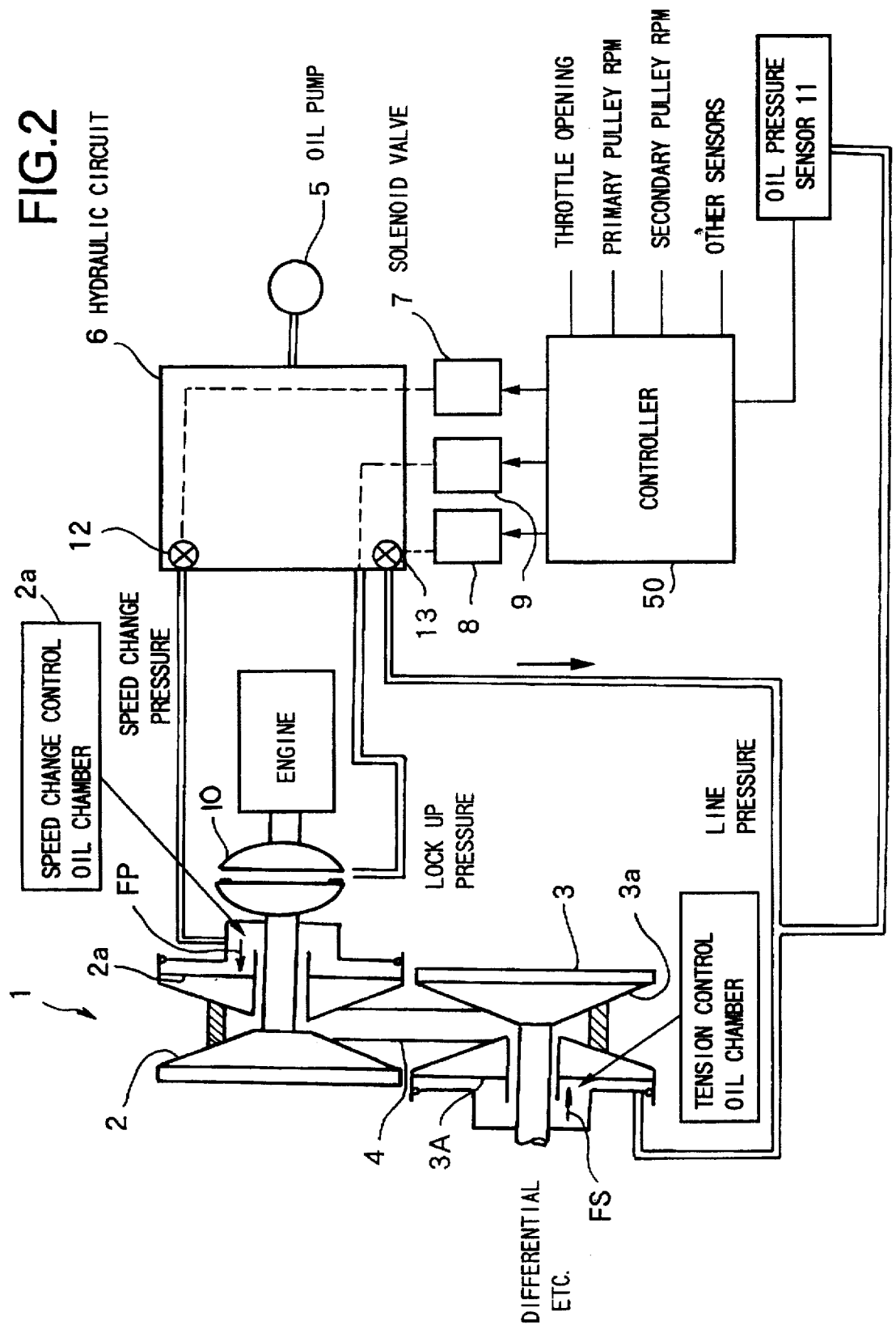
FIG. 2 is a system diagram showing an embodiment of the present invention.

FIG. 2 is a system diagram of one embodiment.

A continuously variable transmission (CVT) 1 is provided with an engine side primary pulley 2, a drive shaft (differential) side secondary pulley 3, and a belt 4 made from synthetic rubber or metal or a combination of these, connecting therebetween. A pulley ratio (effective belt wrapping diameter of the secondary pulley/effective belt wrapping diameter of the primary pulley) is changed by adjusting a speed change pressure to a primary pulley actuator 2a (in this embodiment described as a speed change control oil chamber. However this can also be a tension control oil chamber (contact face pressure control oil chamber)), and a line pressure to a secondary pulley actuator 3a (in this embodiment described as a tension control oil chamber (contact face pressure control oil chamber). However this can also be a tension control oil pressure chamber), so that the speed change ratio can be steplessly changed. However, another continuously variable transmission such as a known toroidal type CVT may be used.

That is to say, the continuously variable transmission 1 is one comprising; a drive side rotating member which receives a rotation force from a drive source, a driven side rotating member, and a drive transmission member disposed therebetween, with a speed change ratio between the drive side rotating member and the driven side rotating member able to be steplessly set by steplessly changing a drive side contact radius (a distance of a contact position of the drive side rotating member and the drive transmission member from the rotation axis), and a driven side contact radius (a distance of a contact position of the driven side rotating member and the drive transmission member from the rotation axis) relative to each other. With the present embodiment, the primary pulley 2 corresponds to the drive side rotating member, the secondary pulley 3 corresponds to the driven side rotating member, and the belt 4 corresponds to the drive transmission member (wrapping type transmission medium).

With the speed change pressure and the line pressure, the oil pressure inside the respective hydraulic lines (for example the broken line portions in FIG. 2 ) disposed inside a hydraulic circuit 6 connected to an oil pump 5, is regulated by the opening/closing of solenoid valves 7, 8 or the like which have a relief function, and by means of flow control valves 12, 13 for speed change pressure and line pressure control, disposed in the respective hydraulic lines. Drive control of the solenoid valves 7, 8 is controlled by a controller 50.

More specifically, so as to achieve the required speed change ratio corresponding to running conditions and the like, the speed change pressure and line pressure are controlled by the controller 50 by means of the solenoid valves 7, 8, so that the speed change ratio is controlled to a target value. The solenoid valves 7, 8 may respectively comprise several solenoid valves, with the target speed change ratio and line pressure being achieved by opening/closing combinations of the several solenoid valves.

A lock up pressure is also controlled in the same manner by the opening/closing operation of the solenoid valve 9 based on a signal from the controller 50. The lock up pressure is for giving to a torque converter 10 disposed between the continuously variable transmission (CVT) 1 and the engine, direct drive under predetermined conditions from the view point of reducing fuel consumption and the like.

For controlling the speed change ratio, signals such as a throttle valve opening signal, a primary pulley rotational speed signal, a secondary pulley rotational speed signal, a vehicle speed signal, and an engine rotational speed signal are input to the controller 50.

Figure 3:
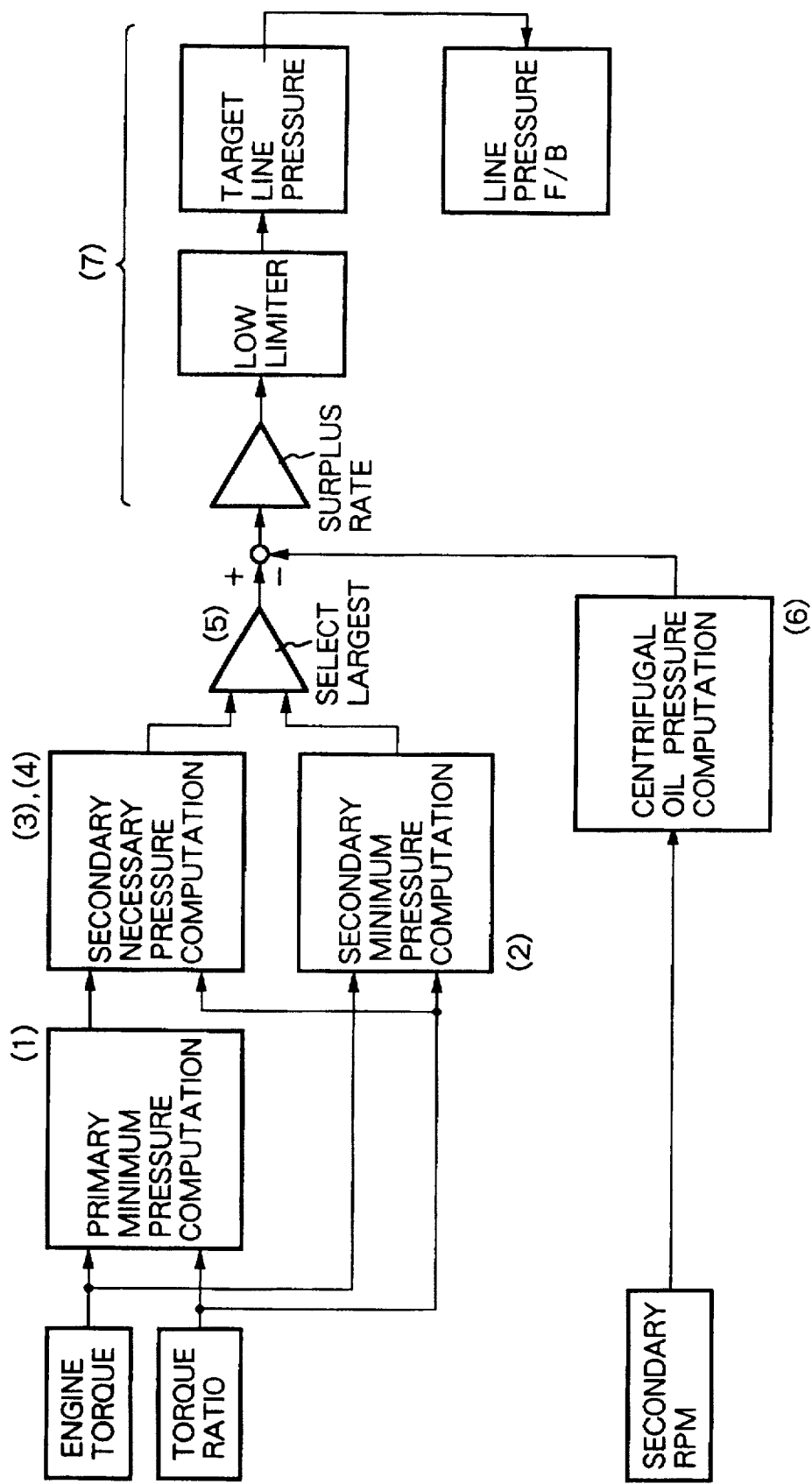
FIG. 3 is a block diagram for a line pressure setting control in the embodiment.
Figure 4:
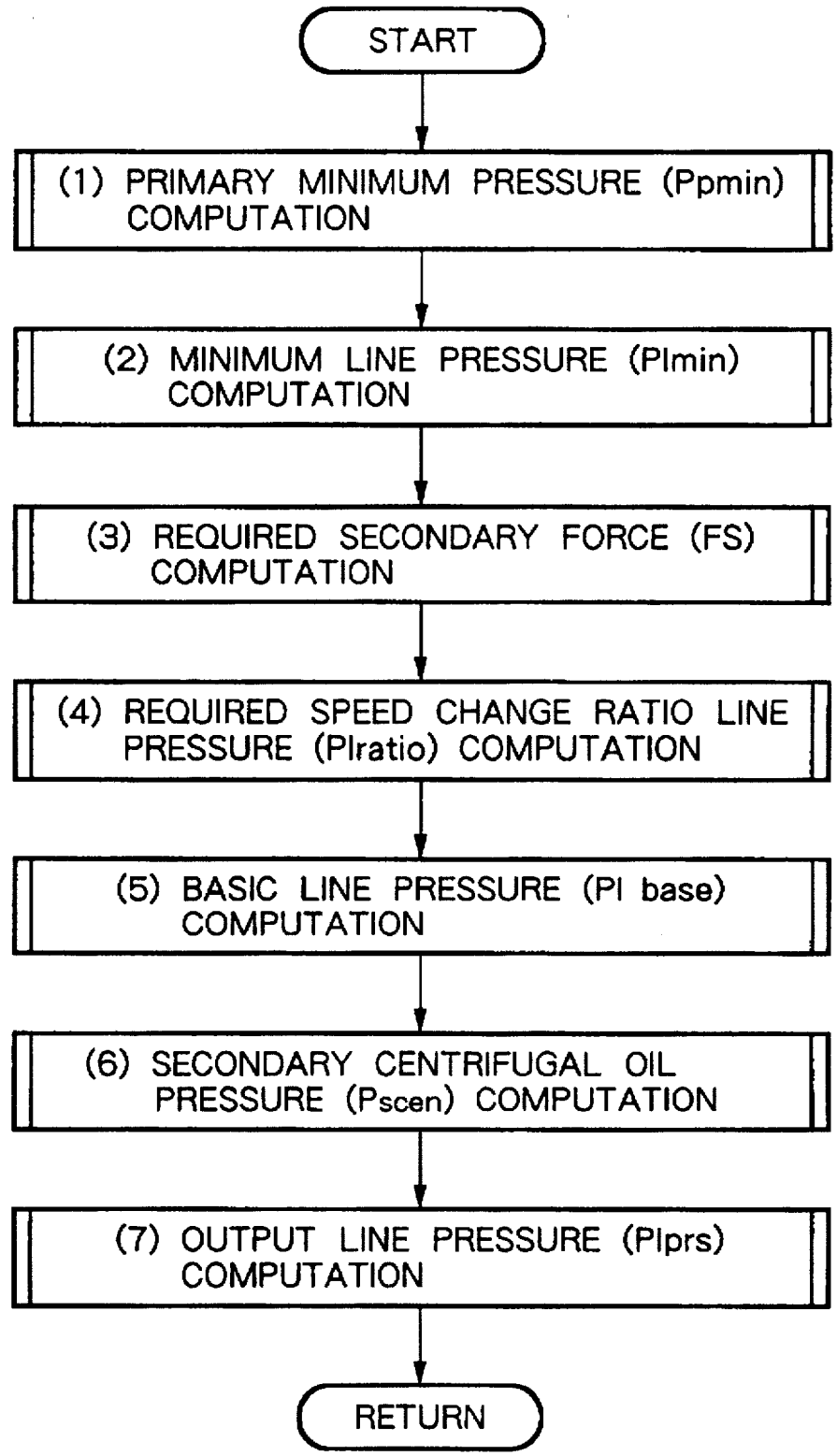
FIG. 4 is a flow chart showing a line pressure setting control routine in the embodiment.

With the present embodiment, the controller 50 executes the block diagram shown in FIG. 3, that is to say the flow chart of FIG. 4, to set the targets for the speed change pressure and the line pressure for optimizing the speed change ratio control.

In block (1), a minimum pressure (Ppmin; corresponding to the third oil pressure of the present invention) for the speed change pressure supplied to the primary pulley actuator 2a (speed change ratio control oil chamber) is computed. That is to say, the necessary minimum pressure (Ppmin) for the speed change pressure which can achieve the target speed change ratio without slipping of the belt 4 is computed.

Basically, this is achieved by executing the flow chart of FIG. 5.

With this routine, in step 11 (with step denoted by "S" in the figures), in order to obtain the necessary minimum primary pressure (Ppmin) of the speed change pressure matching with the actual speed change ratio (for example the indicated speed change ratio from the controller 50) and the engine torque, then at first a magnification (Θ1/Θ) for the necessary minimum primary pressures (speed change pressure) for the respective speed change ratios is obtained for a speed change ratio=1, by referring to a map or the like wherein the magnifications are set based on a relationship between the engine torque (alternatively this can be the input torque to the continuously variable transmission 1) and the necessary minimum primary pressure. In the controller 50, a map wherein the speed change ratio is determined based on the vehicle speed VSP and the throttle valve opening TVO is referred to, and the speed change ratio then set for the current vehicle speed VSP and throttle valve opening TVO. Moreover, the speed change ratio can also be set so as to obtain the vehicle speed intended by the driver while maintaining a desired engine operating condition. In this case, since the engine operating conditions for good fuel consumption and exhaust gas properties can be maintained, then this can be advantageous with regards to fuel consumption and exhaust gas properties and the like.

Then in step 12, the minimum primary pressure (Ppmin) is obtained according to the following equation.

Minimum primary pressure (Ppmin)=Engine torque×Θ× Magnification+Offset amount where the offset amount is a surplus amount.

Here, block (1) constitutes a third oil pressure computing step or device of the present invention.

In block (2) the minimum pressure (Plmin; corresponding to the first oil pressure of the present invention) of the line pressure supplied to the secondary pulley actuator 3a (tension control oil pressure chamber) is computed. That is to say, the necessary minimum pressure (Plmin) so that the belt 4 does not slip at the secondary pulley 3 side is computed.

Figure 6:
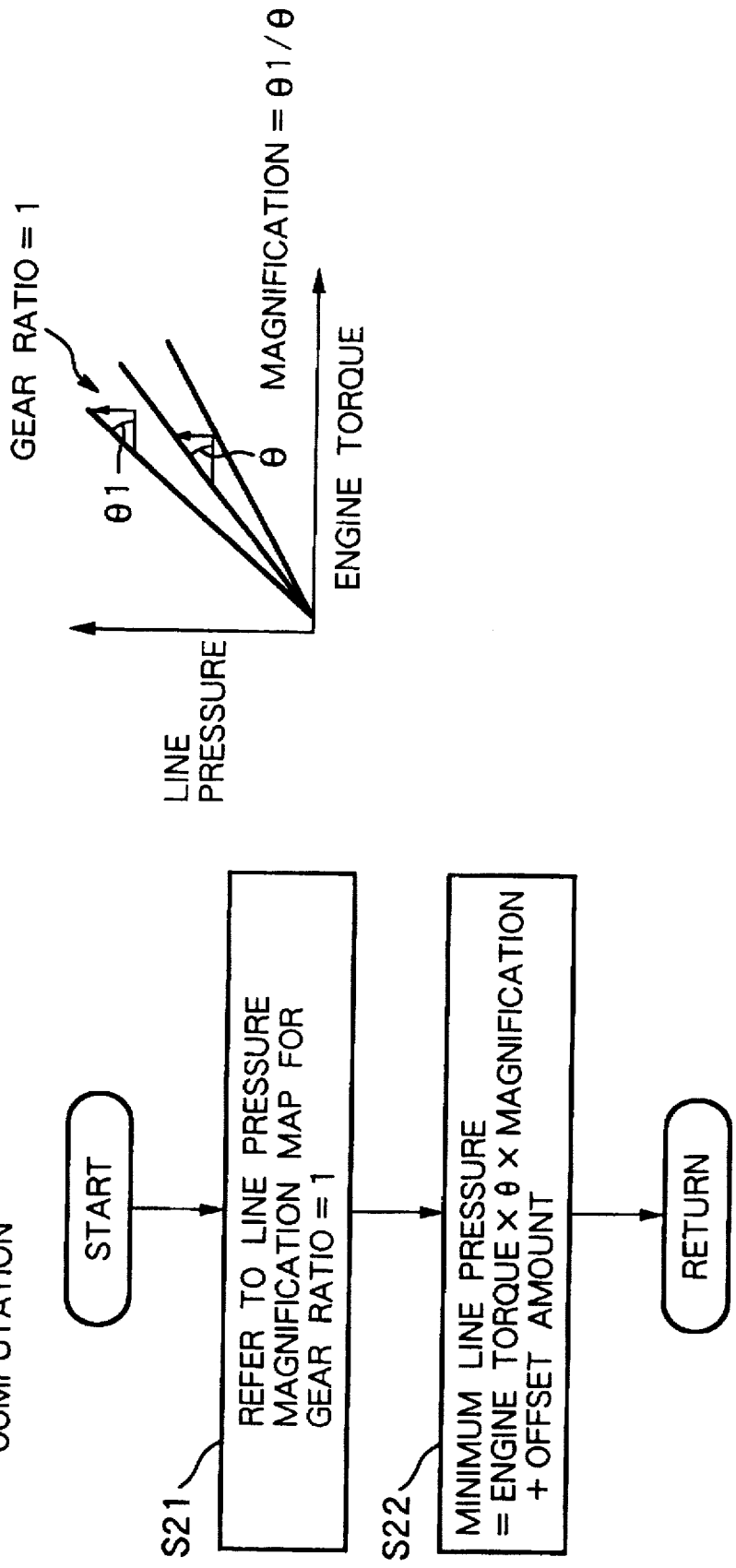
FIG. 6 is a flow chart for explaining a block (2)

Basically, this is achieved by executing the flow chart of FIG. 6.

With this routine, in step 21, in order to obtain the necessary minimum pressure (Plmin) of the line pressure matching with the actual speed change ratio and the engine torque, the magnification (Θ1/Θ) for the necessary minimum line pressures for the respective speed change ratios is obtained for a speed change ratio=1, by referring to a map or the like wherein the magnifications are set based on the relationship between the engine torque (alternatively this can be the input torque to the continuously variable transmission 1) and the necessary minimum line pressure.

Then in step 22, the minimum line pressure (Plmin) is obtained according to the following equation.

Minimum line pressure (Ppmin)=Engine torque×Θ×Magnification+Offset amount where the offset amount is a surplus amount.

Here, block (2) constitutes a first oil pressure computing step or device of the present invention.

In block (3) the calculation of the required force (FS) for the movable wall 3A of the secondary pulley actuator 3a is carded out.

That is to say, the required force (pressing force) on the movable wall 3A of the secondary pulley actuator 3a is determined so as to achieve a desired speed change ratio (secondary pulley effective diameter/primary pulley effective diameter=primary pulley rotational speed/secondary pulley rotational speed; referred to also as torque ratio) wherein slippage of the belt 4 on the primary pulley side does not occur. When the force (in other words the pressure) on one or other of the primary pulley actuator 2a or the secondary pulley actuator 3a is determined, then the force on the other can be logically determined from the relationship between the belt tension, the engine torque, and the torque ratio. Consequently, in order to obtain the desired speed change ratio, since the force (FP) on the primary pulley actuator 2a can be determined from the minimum primary pressure (Ppmin) set by the solenoid valve 7 and the like, and the area of the primary pulley side movable wall 2A, then the required secondary force (FS) can be obtained based on this in block (3). Then in block (4), the required pressure for the secondary pulley side necessary to achieve the desired speed change ratio without slippage of the belt 4 on the primary pulley side is computed based on the required secondary force (FS).

Figure 7:
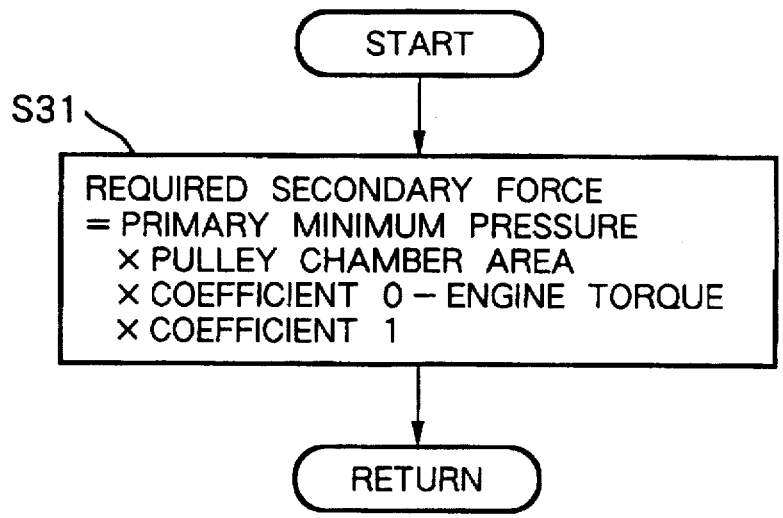
FIG. 7 is a flow chart for explaining a block (3)

Basically, the required secondary force (FS) in block (3) is obtained by executing the flow chart of FIG. 7.

In step 31, the required secondary force (FS) is computed based on the following equation:

Required secondary force (FS)=Minimum primary pressure (Ppmin)× Primary pulley movable wall 2A area×Coefficient 0−Engine torque×Coefficient 1 where Coefficient 0 and Coefficient 1 are coefficients determined for the speed change ratio.

In block (4) calculation of the required speed change ratio line pressure (Plratio) is carried out based on the required secondary force FS obtained in block (3).

Figure 8:
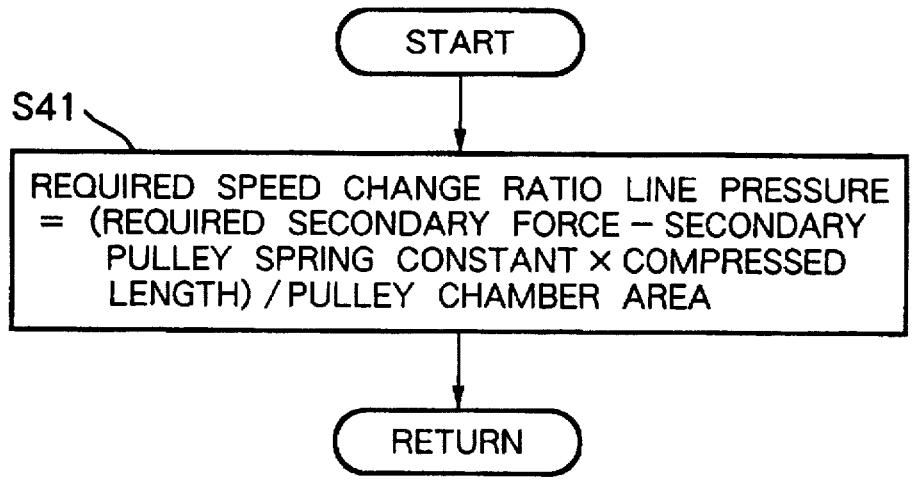
FIG. 8 is a flow chart for explaining a block (4)

Basically, the required speed change ratio line pressure (Plratio) is obtained by executing the flow chart of FIG. 8.

With this routine, in step 41 the required speed change ratio line pressure (Plratio) is computed based on the following equation:

Required speed change ratio line pressure (Plratio)={Required secondary force (FS)−Secondary pulley spring constant×Compressed length}/Movable wall 3A area The secondary pulley spring constant is the constant of a spring (not shown) used to force back the movable wall 3A in the secondary pulley actuator 3a, against the line pressure. The spring constant×compressed length may also be treated as a constant value.

Here, blocks (3) and (4) constitute a second oil pressure computing step or device of the present invention.

Computation of the basic line pressure (Pl base) is carried out in block (5).

In this computation, the line pressure (Plprs; described later) which finally acts on the secondary pulley actuator 3a, is determined based for example on the supply line pressure (basic line pressure Pl base), a secondary centrifugal oil pressure (Pscen; described later) which pushes in the direction of movement of the movable wall 3A caused by the centrifugal force of the oil confined inside the secondary pulley actuator 3a, and the secondary pulley spring force. Therefore at first, the basic line pressure (Pl base) is computed as a base for obtaining the final line pressure.

Figure 9:
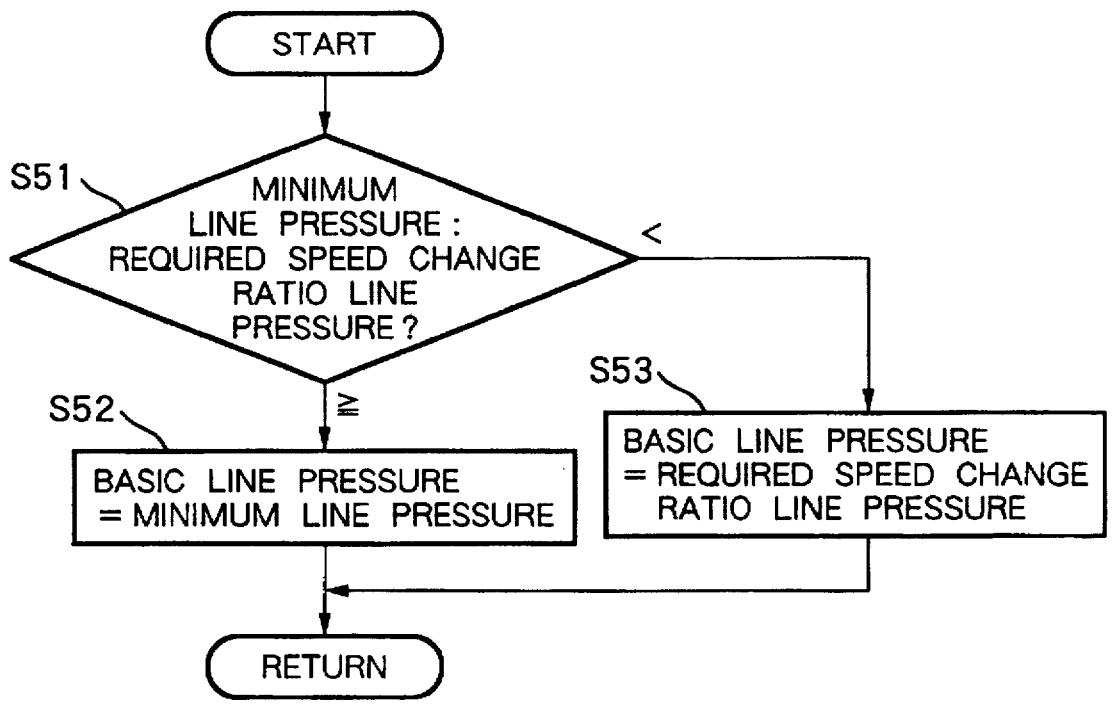
FIG. 9 is a flow chart for explaining a block (5)

Basically, this involves execution of the flow chart of FIG. 9.

With this routine, in step 51 the minimum line pressure (Plmin) for non slippage of the belt 4, and the required speed change ratio line pressure (Plratio) for achieving the desired speed change ratio, are compared. When Minimum line pressure (Plmin)>Required speed change ratio line pressure (Plratio), control proceeds to step 52. On the other hand, when Minimum line pressure (Plmin)<Required speed change ratio line pressure (Plratio), control proceeds to step 53.

In step 52, the basic line pressure (Pl base) is made equal to the minimum line pressure (Plmin) in order to give priority to prevention of slippage of the belt 4, and the routine then terminated.

In step 53, since there is a surplus with respect to slippage of the belt 4, the basic line pressure (Pl base) is made equal to the required speed change ratio line pressure (Plratio), and the routine then terminated.

Block (5) constitutes the part for selecting an oil pressure of a contact face pressure control oil chamber oil pressure control step or device of the present invention.

Computation of the secondary centrifugal oil pressure (Pscen) is carried out in block (6).

Figure 10:
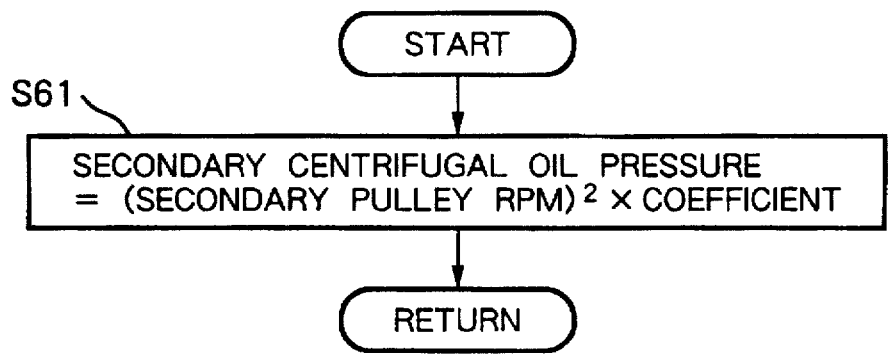
FIG. 10 is a flow chart for explaining a block (6)

Basically, this involves execution of the flow chart of FIG. 10.

With this routine, in step 61 the secondary centrifugal oil pressure (Pscen) is obtained according to the following equation:

Secondary centrifugal oil pressure (Pscen)=(Secondary pulley rotational speed)$^2$×Coefficient.

In block (7) computation of the final output line pressure (Plprs) is carried out. This is obtained based on the basic line pressure (Pl base) obtained in (5), the secondary centrifugal oil pressure (Pscen) obtained in (6), and the secondary pulley spring force and the like.

Figure 11:
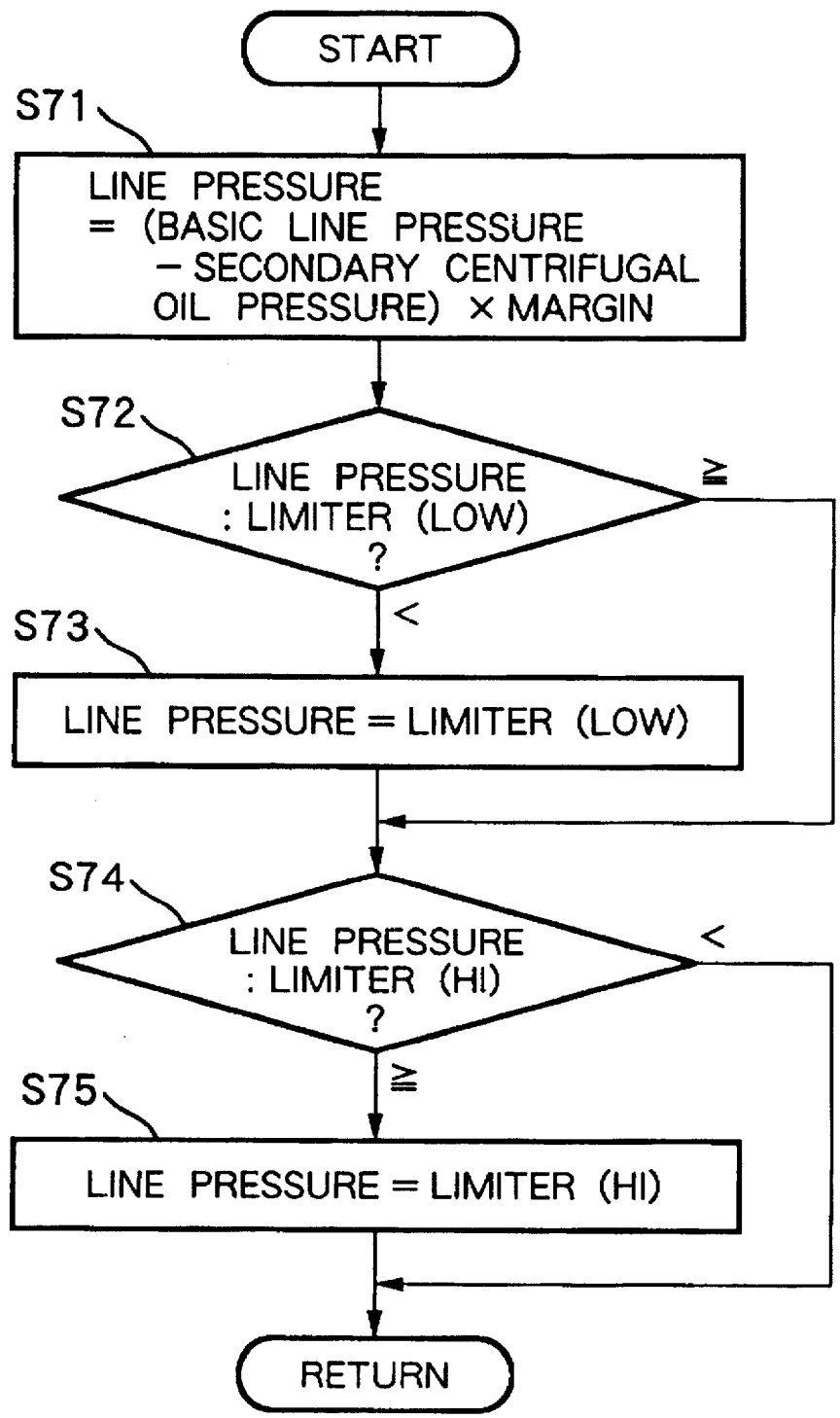
FIG. 11 is a flow chart for explaining a block (7)

Basically this involves execution of the flow chart of FIG. 11.

With this routine, in step 71 the output line pressure (Plprs) is obtained according to the following equation;

Output line pressure (Plprs)={Basic line pressure (Pl base)-Secondary centrifugal oil pressure (Pscen)}×Margin.

With the margin, the secondary pulley spring force and the like is also considered as well as a safety factor.

In step 72, an output line pressure (Plprs) and a limiter (LOW) (lower limit) are compared. The limiter (lower limit) may be set for each operating condition.

If Output line pressure (Plprs)<Limiter (LOW), control proceeds to step 73.

If Output line pressure (Plprs)≧Limiter (LOW), control skips step 73 to step 74.

In step 73, the output line pressure (Plprs) is set equal to the limiter (LOW). That is to say, it is set to a line pressure which is the minimum pressure (lower limit oil pressure) which can be supplied by the hydraulic circuit 6. In this way, the line pressure can be well maintained at a predetermined value. For example problems caused by the set pressure being too low, such as being unable to well maintain the line pressure (for example due to the occurrence of hunting and the like), or being unable to well realize the line pressure control function, can be eliminated. Moreover, it is also possible to prevent the occurrence of control degradation accompanying computational errors and the like. Furthermore, there are cases wherein the belt slips at the time of transition even though the line pressure is such there is no belt slippage during steady state operation. However at this time, the computed line pressure (line pressure during transition for belt slip) can be set higher, so that belt slippage during transition can also be positively prevented.

In step 74, the output line pressure (Plprs) and a limiter (Hl) (upper limit) are compared. The limiter (Hl) may be set for each operating condition.

If Output line pressure (Plprs)<Limiter (Hl), step 75 is skipped and the routine terminated. That is to say, in this case, the computational results in step 71 are set as the final output line pressure (Plprs).

On the other hand, if Output line pressure (Plprs)<Limiter (Hl), control proceeds to step 75.

In step 75, the output line pressure (Plprs) is set equal to the limiter (Hl), and the routine terminated. That is to say, it is set to a line pressure which is the maximum pressure (upper limit oil pressure) which can be supplied by the hydraulic circuit 6. In this way, undesirable events such as an abnormal increase in friction (where this hinders rotation) due to an excessive increase in belt tension, damage to the secondary pulley actuator 3a or to the line pressure supply path, and excessive operation of the oil pump, can be positively prevented. Moreover, the occurrence of poor control accompanying computational errors and the like can also be prevented.

In the case where the output line pressure (Plprs) obtained in this way is controlled by means of a flow control valve 13 and the like incorporated in the hydraulic circuit 6, the pressure acting on the valve body of the flow control valve 13 is adjusted for example by means of the solenoid valve 8 and the like or by switching the hydraulic pressure paths so as to give a flow rate for obtaining the output line pressure (Plprs), with adjustment being made by carrying out valve opening adjustment. That is to say, the conventional speed change pressure control shown as an example in FIG. 12 can be applied to the line pressure control.

Consequently, blocks (4), (5), (6), and (7) correspond to a contact face pressure control oil chamber oil pressure control step or device of the present invention.

In the above manner, the necessary minimum line pressure (Plmin; first oil pressure) for the non occurrence of slippage between the secondary pulley 3 and the belt 4 is computed, and also the required speed change ratio line pressure (Plratio; second oil pressure) which can realize the target speed change ratio without slippage on the primary pulley side 2 is computed. The highest of these is then selected, and the final output line pressure (Plprs) obtained based on the selected line pressure. Since the obtained line pressure is supplied to the secondary pulley actuator 3a, then the slippage of the drive transmission member occurring in a case wherein as with the conventional arrangement only one of the drive side rotating member side and the driven side rotating member side is considered with no relation therebetween, can be reliably prevented, and the problem wherein the target speed change ratio (torque ratio) can not be achieved, can be reliably solved. At the same time, since control to realize the target speed change ratio for non slippage on the primary pulley 2 side, is carried out on the secondary pulley actuator 3a side separate from the speed change ratio control, then in contrast to the case as with the conventional arrangement, wherein all of the control is born by the flow control valve used for speed change control, the construction can be significantly simplified, In an attempt to significantly improve the accuracy of the line pressure control (suppress component scatter and the like), as shown in FIG. 2, an oil pressure sensor 11 can be provided for detecting line pressure, and feedback control carried out by means of the controller 50 so as to obtain a target output line pressure (Plprs) based on the detected pressure. (refer to the block diagram of FIG. 3).

Figure 1:
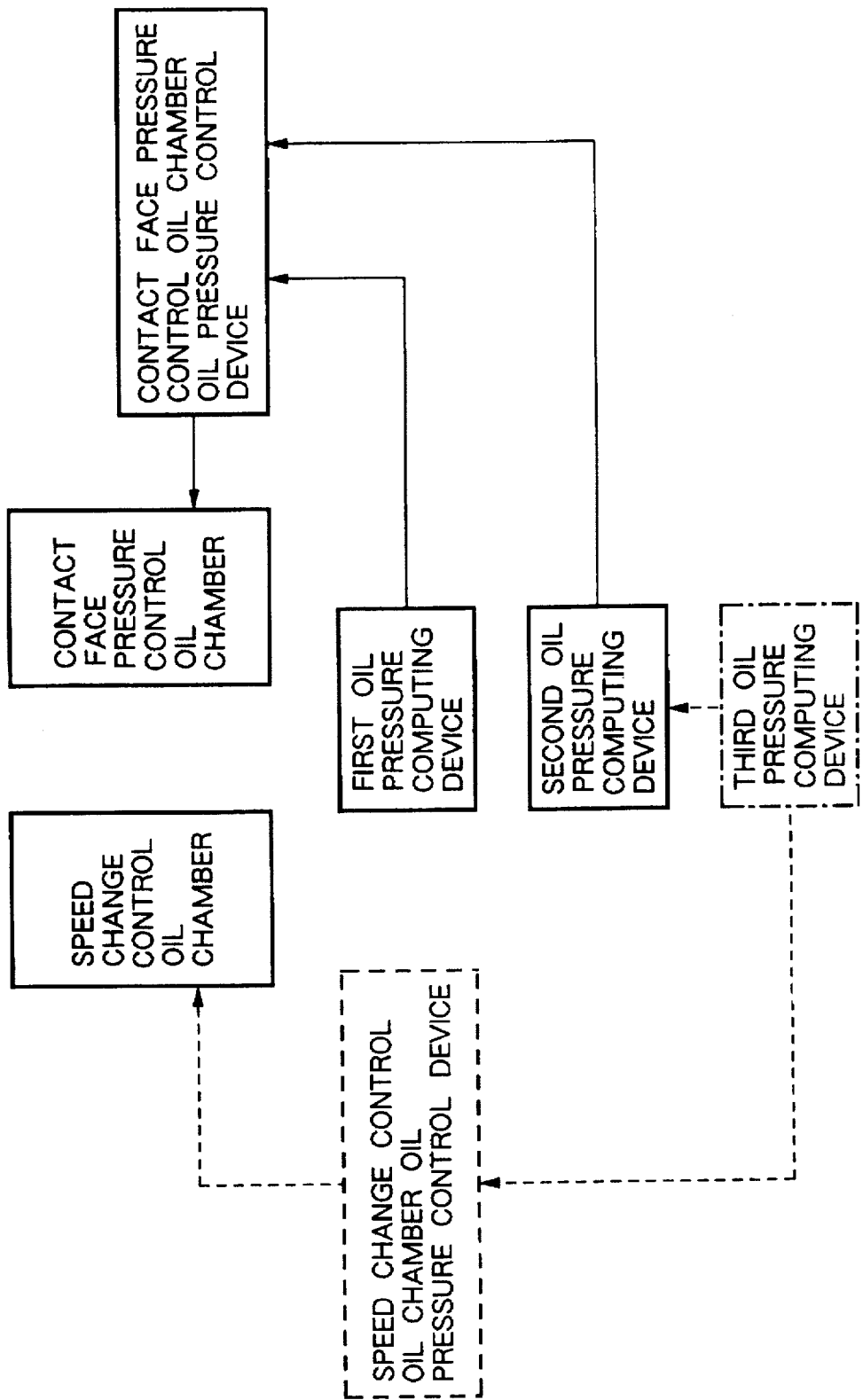
FIG. 1 is a structural diagram showing a structure of the present invention.
Figure 12:
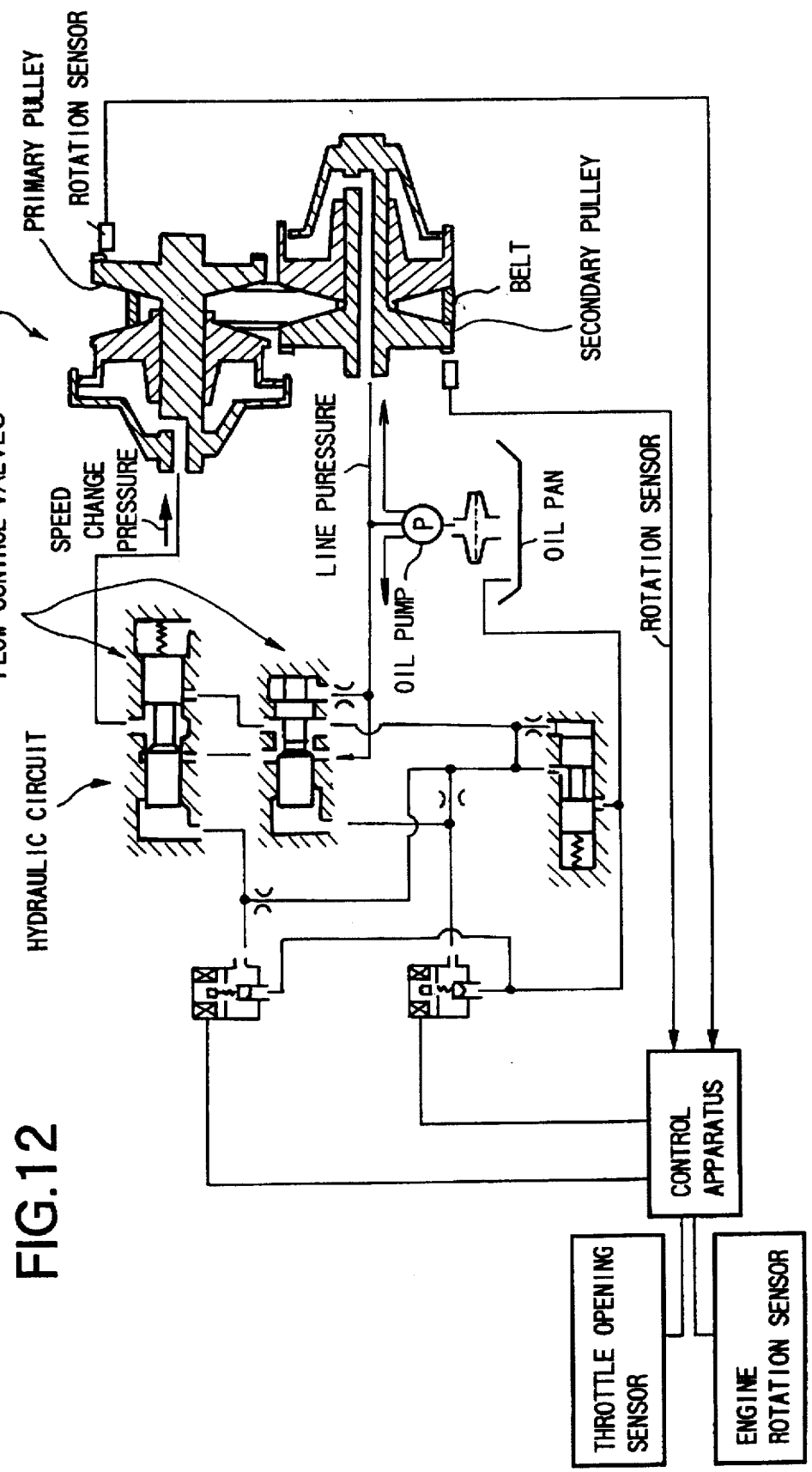
FIG. 12 is a diagram illustrating a conventional hydraulic circuit.

Moreover, the minimum speed change pressure (Ppmim) for supply to the primary side actuator 2a, can be controlled by means of the flow control valve 12 and the like incorporated in the hydraulic circuit 6 as with the conventional circuit (see FIG. 12). Hence the complicated construction in the speed change ratio control side can be avoided (since control for speed change ratio is possible), and control can thus be achieved with a construction similar to the conventional construction (see FIGS. 1 and 2).

Moreover, with regards to the speed change pressure and line pressure control of the present invention, description in the above embodiments has been given for an engine as the drive source. However the invention is also applicable to the case wherein other drive sources are used. Moreover, as well as being applied to vehicles, the present invention can also be applied to the case where optional rotational speed drive is taken off from drive source in machines such as stationary type, industrial, and manufacturing machines.

What is claimed is:

1. A method of controlling a continuously variable transmission having:
    a drive side rotating member which receives a rotation force from a drive source, a driven side rotating member, and a drive transmission member which provides an operative drive connection between the drive side rotating member and the driven side rotating member;
    a speed change control oil chamber for carrying out speed change by changing one of:
        a drive side contact radius which is a distance from a contact position between the drive side rotating member and the drive transmission member, to a rotation axis of the drive side rotating member, and
        a driven side contact radius which is a distance from a contact position between the driven side rotating member and the drive transmission member, to a rotation axis of the driven side rotating member, by the supply or discharge of an operating oil based on a signal from a control apparatus, and
    a contact face pressure control oil chamber for controlling the contact radius on the side which is not speed change controlled by the speed change control oil chamber, the contact face pressure control oil chamber supplying a contact face pressure on the transmission member necessary for torque transmission, said method; comprising the steps of:
        computing a first oil pressure as a minimum limit pressure for the contact face pressure control oil chamber necessary to prevent drive transmission member slippage;
        computing a second oil pressure as a minimum limit pressure for the contact face pressure control oil chamber necessary to maintain a target speed change ratio; selecting a higher of the first oil pressure and the second oil pressure;
        controlling the pressure in the contact face pressure control oil chamber to the selected pressure;
        computing a third oil pressure as a minimum limit oil pressure of said speed change control oil chamber necessary to prevent drive transmission member slippage; and
        computing the second oil pressure based on the third oil pressure and an input torque which is input to at least the drive side rotating member.

2. A method of controlling a continuously variable transmission according to claim 1, wherein the third oil pressure is computed based on said input torque and the target speed change ratio.

3. A method of controlling a continuously variable transmission according to claim 1, wherein the third oil pressure is derived by computing a pressure for a predetermined speed change ratio based on the input torque and a necessary pressure per unit torque in a predetermined reference speed change ratio, and correcting the computed result based on the speed change ratio.

4. A method of controlling a continuously variable transmission according to claim 1, wherein the first oil pressure is derived by computing a pressure for a predetermined speed change ratio based on the input torque and a necessary pressure per unit torque in a predetermined reference speed change ratio, and correcting the computed result based on the speed change ratio.

5. A method of controlling a continuously variable transmission according to claim 1, wherein said drive side rotating member comprises a pulley with a changeable effective wrapping diameter, said driven side rotating member comprises a pulley with a changeable effective wrapping diameter, and said drive transmission member comprises a wrapping type transmission medium for wrapping around these.

6. An apparatus for controlling a continuously variable transmission comprising:
    a drive side rotating member which receives a rotation force from a drive source;
    a driven side rotating member, and a drive transmission member disposed therebetween for transmitting drive between both members;
    a speed change control oil chamber for carrying out speed change by changing one of:
        a drive side contact radius which is a distance from a contact position between the drive side rotating member and the drive transmission member to a rotation axis of the drive side rotating member, and
        a driven side contact radius which is a distance from a contact position between the driven side rotating member and the drive transmission member to a rotation axis of the driven side rotating member, by the supply or discharge of an operating oil based on a signal from a control apparatus; and
    a contact face pressure control oil chamber for controlling the contact radius on the side which is not speed change controlled by the speed change control oil chamber, and applying a contact face pressure on the transmission member necessary for torque transmission, said apparatus comprising:
        first oil pressure computing means for computing a first oil pressure, the first oil pressure being the minimum limit pressure for the contact face pressure control oil chamber necessary so that slippage of the drive transmission member does not occur;
        second oil pressure computing means for computing a second oil pressure, the second oil pressure being the minimum limit pressure for the contact face pressure control oil chamber necessary to maintain a target speed change ratio;

contact face pressure control oil chamber oil pressure control means for selecting higher of the two computed pressures and controlling the pressure in the contact face pressure control oil chamber to the selected pressure; and a third oil pressure computing means for computing a third oil pressure, the third oil pressure being the minimum limit oil pressure for said speed change control oil chamber necessary to prevent slippage of said drive transmission member, and wherein said second oil pressure computing means computes the second oil pressure based on said computed third oil pressure and the input torque which is input at least to the drive side rotating member.

7. An apparatus for controlling a continuously variable transmission according to claim 6, wherein said third oil pressure computing means computes the third oil pressure based on said input torque and the target speed change ratio.

8. An apparatus for controlling a continuously variable transmission according to claim 6, wherein said third oil pressure computing means computes the third oil pressure by computing a pressure in a predetermined speed change ratio based on said input torque and a necessary pressure per unit torque in a predetermined reference speed change ratio, and correcting the computed result based on the speed change ratio.

9. An apparatus for controlling a continuously variable transmission according to claim 6, wherein said first oil pressure computing means computes the first oil pressure by computing a pressure in a predetermined speed change ratio based on said input torque and a necessary pressure per unit torque in a predetermined reference speed change ratio, and correcting the computed result based on the speed change ratio.

10. An apparatus for controlling a continuously variable transmission according to claim 6, wherein said drive side rotating member comprises a pulley with a changeable effective wrapping diameter, said driven side rotating member comprises a pulley with a changeable effective wrapping diameter, and said drive transmission member comprises a wrapping type transmission medium for wrapping around these.

* * * * *